United States Patent
Troemel, Jr. et al.

(10) Patent No.: US 7,679,685 B2
(45) Date of Patent: Mar. 16, 2010

(54) SYSTEM AND METHOD FOR PROCESSING VIDEO SIGNALS

(75) Inventors: Hans Alfred Troemel, Jr., Sharpsburg, GA (US); Dallas Dwight Hickerson, Sharpsburg, GA (US)

(73) Assignee: Panasonic Automotive Systems of America division of Panasonic Corporation of North America, Peachtree City, GA (US)

( * ) Notice: Subject to any disclaimer, the term of this patent is extended or adjusted under 35 U.S.C. 154(b) by 1042 days.

(21) Appl. No.: 11/361,170

(22) Filed: Feb. 24, 2006

(65) Prior Publication Data

US 2007/0200959 A1    Aug. 30, 2007

(51) Int. Cl.
*H04N 9/77* (2006.01)
*H04N 9/67* (2006.01)

(52) U.S. Cl. .................................. 348/663; 348/659

(58) Field of Classification Search ......... 348/663–670, 348/659, 488, 489, 492, 493; 386/31, 34
See application file for complete search history.

(56) References Cited

U.S. PATENT DOCUMENTS

| | | | |
|---|---|---|---|
| 4,241,363 A | 12/1980 | Maeyama et al. | |
| 4,535,352 A * | 8/1985 | Haskell | 348/437.1 |
| 4,633,187 A | 12/1986 | Nishimura et al. | |
| 4,717,951 A * | 1/1988 | Fling | 348/566 |
| 4,782,269 A * | 11/1988 | Haferl | 315/371 |
| 5,043,798 A * | 8/1991 | Emori | 375/240.25 |
| 5,053,864 A | 10/1991 | Thompson | |
| 5,257,107 A * | 10/1993 | Hwang et al. | 386/33 |
| 5,822,490 A * | 10/1998 | Strolle | 386/1 |
| 5,926,220 A | 7/1999 | Linzer | |
| 6,052,157 A * | 4/2000 | Weihs | 348/663 |
| 6,104,863 A | 8/2000 | Strolle et al. | |
| 2002/0186323 A1 * | 12/2002 | Sacca | 348/488 |

* cited by examiner

*Primary Examiner*—Victor Kostak
(74) *Attorney, Agent, or Firm*—Laurence S. Roach

(57) ABSTRACT

The disclosed embodiments relate to a system (100) that processes an analog video signal (502), the analog video signal (502) comprising luminance information (408), first chrominance information (410), and second chrominance information (410). An exemplary video system (100) comprises a first time-sampled analog filter (506) that extracts the luminance information (408) from a first aliased copy of the analog video signal (502), a second time-sampled analog filter (508) that extracts the first chrominance information (410) from a second aliased copy of the analog video signal (502), and a third time-sampled analog filter (510) that extracts the second chrominance information (410) from a third aliased copy of the analog video signal (502).

48 Claims, 4 Drawing Sheets

SYSTEM AND METHOD FOR PROCESSING VIDEO SIGNALS

FIELD OF THE INVENTION

The present invention relates to improving the processing of video signals in communication systems, including National Television System Committee (NTSC) analog video signals.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Composite video signals are currently used in a wide range of video display systems. Such signals embody all information needed to recreate a video image. This information is encoded into the composite signal in the form of luminance information and chrominance information. When extracted from the composite signal, the luminance and chrominance information is used to construct red, green, and blue color video signals.

Known methods of extracting the luminance and chrominance information from an analog composite video signal include transforming the analog composite video signal into digital form and employing a two or three line comb filter to the signal. Another method is to employ a simple band pass/notch filter to the signal. Another known method is to employ bulk acoustic wave delay lines to allow comb filtering without digitizing the signal. These known methods are expensive in terms of component cost, complex to implement and/or provide undesirable results. In addition, known analog methods of extracting luminance and chrominance information undesirably require manual initial tuning or set-up adjustment. Such analog methods also provide less than ideal quality because they do not isolate the portion of the frequency spectrum of the input signal that comprises luminance information from the portion of the frequency spectrum that comprises chrominance information. An improved system and method for extracting luminance and chrominance information from an analog composite video signal is desirable.

SUMMARY OF THE INVENTION

The disclosed embodiments relate to a system that process an analog video signal, the analog video signal comprising luminance information, first chrominance information, and second chrominance information. An exemplary video system comprises a first time-sampled analog filter that extracts the luminance information from a first aliased copy of the analog video signal, a second time-sampled analog filter that extracts the first chrominance information from a second aliased copy of the analog video signal, and a third time-sampled analog filter that extracts the second chrominance information from a third aliased copy of the analog video signal.

An exemplary method relates to processing an analog video signal, the analog video signal comprising luminance information, first chrominance information, and second chrominance information. An exemplary method comprises the acts of extracting the luminance information from a first aliased copy of the analog video signal, extracting the first chrominance information from a second aliased copy of the analog video signal, and extracting the second chrominance information from a third aliased copy of the analog video signal.

BRIEF DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION OF THE PREFERRED EMBODIMENT

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Exemplary embodiments of the present invention employ a decoder comprising a plurality of filter networks to extract luminance and chrominance information from a sampled analog (continuous time) signal without digitizing the signal. An exemplary embodiment of the present invention exploits the sampling theorem by creating aliased data images centered around different points in a frequency spectrum. A time sampled analog filter (for example, a low pass switch capacitor filter) is employed to separate luminance information from chrominance information in a first aliased image of the composite signal. At the same time, two additional time-sampled analog filters (for example, high pass switch capacitor filters) are employed to demodulate red chrominance information (R-Y) and blue chrominance information (B-Y) from different aliased copies of the sampled analog signal.

As described below, an exemplary embodiment of the present invention is adapted to extract luminance and chrominance information from a standard NTSC analog composite video signal. Time-sampled analog filters, such as low pass and high pass switch capacitor filters, sample the signal at a frequency of 15.734264 kHz (line rate). Chrominance and luminance information can be completely decoded from aliased copies of the input signal with little degradation. In an exemplary embodiment, a low-pass switch capacitor filter employs a bandwidth of 3.933566 kHz (15.734264 kHz divided by 4) to separate the luminance information from the chrominance information. Two high pass switch capacitor filters, each having a bandwidth of 3.933566 kHz (15.734264 kHz divided by 4). The two high pass filter networks employ sampling clocks that are 90 degrees out of phase. The first filter extracts R-Y chrominance information from the composite signal and the second filter extracts B-Y chrominance information. Once extracted from the analog composite signal, the luminance and chrominance information are used to construct red, green and blue video signals.

Figure 1:
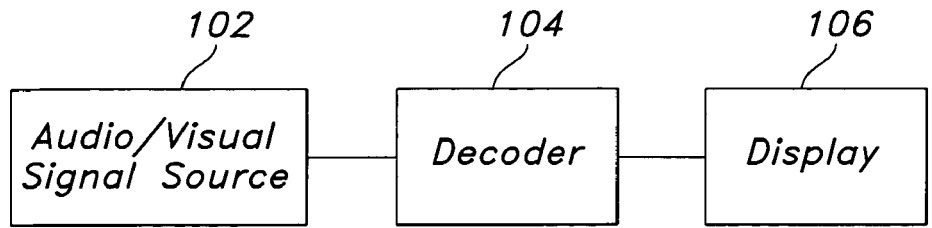
FIG. 1 is a block diagram of a video system in accordance with an exemplary embodiment of the present invention.

FIG. 1 is a block diagram of a video system in accordance with an exemplary embodiment of the present invention. The video system is generally referred to by the reference number 100. The video system 100 comprises an audio/video (A/V) signal source 102. The A/V signal source 102 produces a video signal, such as a typical NTSC analog composite video signal. Examples of A/V signal sources include DVD players, RF receiver output, video games, computer systems, cameras, or the like.

The analog video signal produced by the signal source 102 is delivered to a decoder 104. As set forth below, the decoder 104 comprises filtering circuitry that exploits the sampling theorem to extract luminance and chrominance information from the analog composite signal 502 without transforming the analog composite signal 502 into the digital domain. Also included in the decoder 104 is additional circuitry that develops red, green and blue color signals based on the extracted luminance and chrominance information. Chrominance information extracted by exemplary embodiments of the present invention comprises first chrominance information (R-Y chrominance information) and second chrominance information (B-Y chrominance information), which is obtained by sampling the input signal with sampling clocks that are 90 degrees out of phase relative to each other. The red, green and blue video signals are used to produce an image on a display 106. The operation of the decoder 104 is explained in detail below with reference to FIG. 5.

Figure 2:
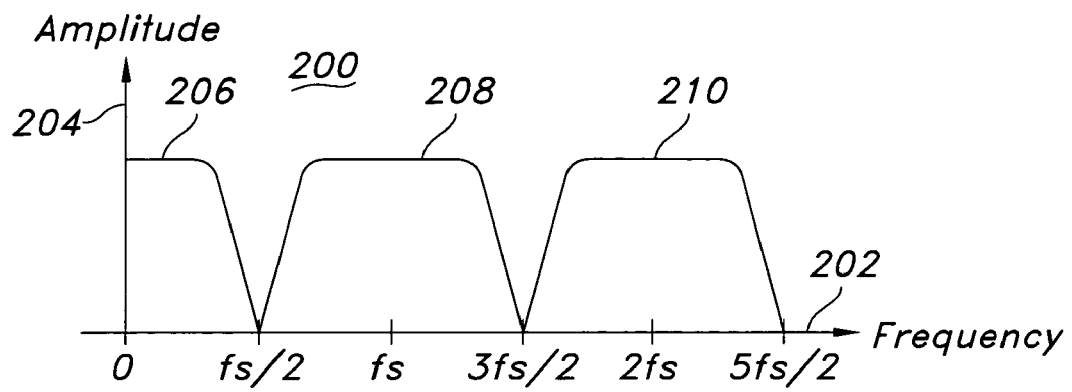
FIG. 2 is a graph showing a low pass filter spectral characteristic.

FIG. 2 is a graph showing a low-pass filter spectral characteristic. The graph is generally referred by the reference number 200. The filter spectral characteristic graph 200 includes an x-axis 202, which represents frequency, and a y-axis 204, which represents signal amplitude. The graph 200 includes a plurality of bandpass envelopes 206, 208 and 210. Each of the bandpass envelopes 206, 208 and 210 represent an aliased image of a sampled signal produced by a technique known as undersampling. Undersampling exploits the Nyquist criteria, which requires the sampling frequency be at least two times the bandwidth of the signal. The sampling thereom states that the sampled analog energy is aliased to a spectral spacing of the sampling frequency ($F_s$) divided by two (2) for real signals and is spectrally spaced by the intervals of $F_s$ for complex sampling (I/Q). An exemplary embodiment of the present invention utilizes real sampling. Due to this aliasing characteristic of the sampling thereon, the under-sampled filter characteristic produces a comb filter effect that captures all the desired energy through the aliased bandpass filter envelopes and rejecting the undesired energy by careful selection of the sampling frequency. As an example, the sampling of an NTSC-compatible analog video signal, such as a composite video signal, at a sample frequency $F_s$ of 15.734264 kHz (line rate) creates aliased images of the sampled signal in the bandpass envelopes 206, 208 and 210.

The bandpass envelope 206, which represents the output of a low pass filter, is centered about the y-axis 204. The bandpass envelope 208 is centered about the sample frequency $F_s$ and the bandpass envelope 210 is centered around a frequency of twice the value of $F_s(2F_s)$. The graph 200 represents a low-pass spectral characteristic because it exhibits a relatively high gain between the origin and one-half $F_s(F_s/2)$.

Figure 3:
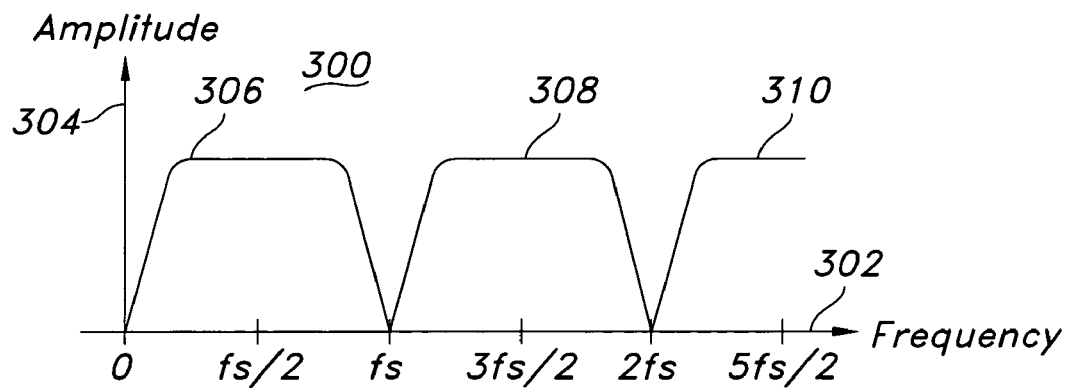
FIG. 3 is a graph showing a high pass filter spectral characteristic.

FIG. 3 is a graph showing a high pass filter spectral characteristic. The graph is generally referred to by the reference number 300. The high pass spectral graph 300 includes an x-axis 302, which corresponds to frequency, and a y-axis 304, which corresponds to signal amplitude. The spectral characteristic graph 300 comprises a plurality of bandpass envelopes 306, 308 and 310, which represent the output of a high pass filter. In the spectral characteristic represented in FIG. 3, aliased images of the sampled signal are created in the bandpass envelopes 306, 308 and 310, respectively, around $F_s/2$, $3F_s/2$ and $5 F_s/2$. The graph 300 represents a high-pass spectral characteristic because it has a notch near the origin and exhibits a relatively high gain around one-half $F_s(F_s/2)$.

Figure 4:
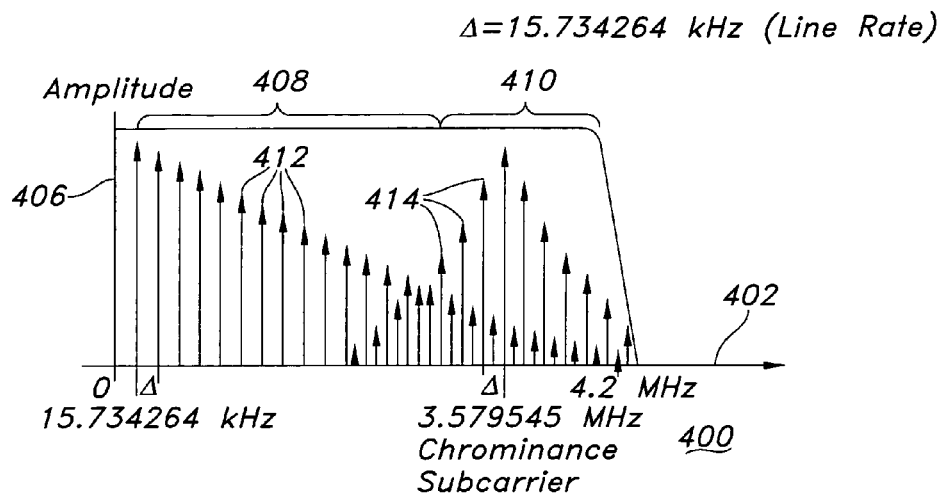
FIG. 4 is a graph showing an NTSC composite frequency spectrum, including a luminance region and a chrominance region.

FIG. 4 is a graph showing an NTSC composite frequency spectrum, including a luminance region and a chrominance region. The graph is generally referred to by the reference number 400. The NTSC frequency spectrum graph 400 includes an x-axis 402, which corresponds to frequency, and a y-axis 406, which corresponds to signal amplitude. As shown in FIG. 4, the NTSC frequency spectrum ranges from 15.734264 kHz at the origin to approximately 4.2 MHz.

The NTSC frequency spectrum comprises a luminance region, as indicated by a bracket 408, and a chrominance region, as indicated by a bracket 410. Luminance information is transmitted in the luminance region 408 of the spectrum by a plurality of luminance subcarriers 412. Chrominance information is transmitted in the chrominance region 410 of the spectrum by a plurality of chrominance subcarriers 414. Those of ordinary skill in the art will appreciate that the chrominance region 410 incorporates both red chrominance information and blue chrominance information, which is desirably demodulated into separate components.

Figure 5:
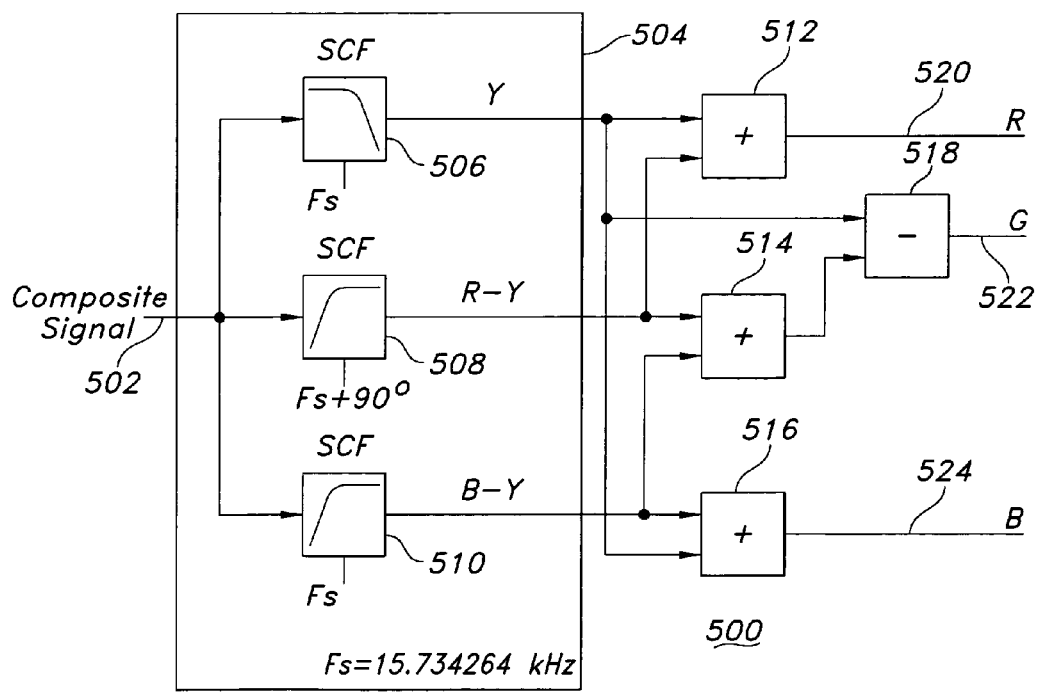
FIG. 5 is a block diagram of a demodulator circuit in accordance with an exemplary embodiment of the present invention.

FIG. 5 is a block diagram of a demodulator circuit in accordance with an exemplary embodiment of the present invention. The demodulator circuit is generally referred to by the reference number 500. In an exemplary embodiment of the present invention, the demodulator circuit 500 is disposed in and forms a part of the decoder 104 (FIG. 1).

In the demodulator circuit 500, a composite signal 502, such as an NTSC analog composite video signal, is delivered to a filter circuit 504. The filter circuit 504 includes a low pass time-sampled analog filter 506, which is adapted to extract a luminance signal Y from the analog composite signal 502. In an exemplary embodiment of the present invention, the low pass time-sampled analog filter 506 employs a sample frequency $F_s$ of 15.734264 kHz, as described above.

The composite signal 502 is additionally delivered to a pair of high pass time-sampled analog filters 508 and 510. In the exemplary embodiment illustrated in FIG. 5, the high pass time-sampled analog filters 508 and 510 each employ a sample frequency $F_s$ of 15.734264 kHz. The sampling clock of the high pass time-sampled analog filter 508 is 90 degrees out-of-phase with the sample clock of the high pass time-sampled analog filter 510. Preferably, the 90 degree phase shift is obtained by applying a phase shift of +45 degrees with respect to one of the high pass time-sampled analog filters 508, 510 and a phase shift of −45 degrees with respect to the other high pass time-sampled analog filter 508, 510. The use of the relative 90 degree phase shift allows one of the high pass time-sampled analog filters 508, 510 to extract red chrominance information R-Y from the composite signal 502 and blue chrominance information B-Y from an aliased copy of the composite signal 502 simultaneously, and without transforming the composite signal 502 into the digital domain. The relative 90 degree phase shift also advantageously results in the equalization or cancellation of any time delay the circuitry of filters may introduce. The red chrominance information R-Y is referred to herein as first chrominance information and the blue chrominance information B-Y is referred to herein as second chrominance information.

The luminance information Y, red chrominance information R-Y and blue chrominance information B-Y are further processed to obtain standard red, green and blue color video signals. As shown in FIG. 5, the luminance information Y, which is output from the low pass time-sampled analog filter 506, is delivered to a plurality of adders 512 and 516. The red chrominance information R-Y, which is produced by the high pass time-sampled analog filter 508, is delivered to the adder 512 and the adder 514. The blue chrominance information B-Y is delivered to the adder 514 and the adder 516. The luminance information Y is also delivered to a subtractor 518. The output of the adder 514 is also delivered to the subtractor 518.

The adder 512 combines the luminance information Y and the red chrominance information R-Y to produce a red color video signal 520. The subtractor 518 subtracts output of the adder 514 from the luminance information received from the low pass time-sampled analog filter 506 to produce a green color signal 522. The adder 516 combines the luminance information with the blue chrominance information B-Y to produce a blue color output signal 524. Thus, the exemplary embodiment of the demodulator 500 illustrated in FIG. 5 allows rapid, efficient extraction of luminance information and chrominance information from a composite video signal while the composite signal is still a sampled analog (continuous time) signal.

Figure 6:
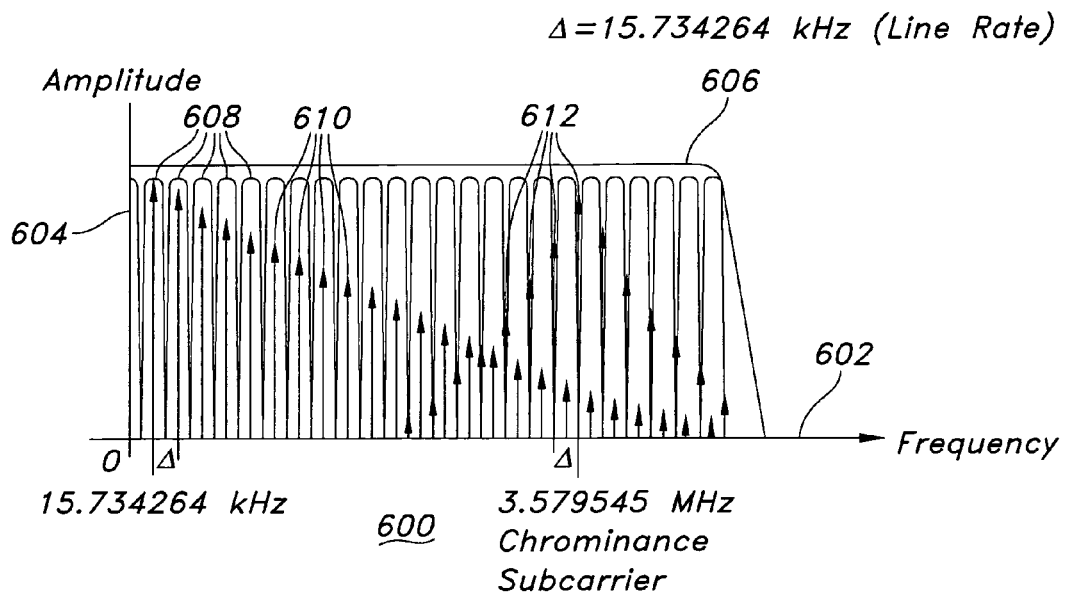
FIG. 6 is a graph showing a filter effect on a luminance spectrum in accordance with an exemplary embodiment of the present invention.

FIG. 6 is a graph showing a filter effect on a luminance spectrum in accordance with an exemplary embodiment of the present invention. The graph is generally referred to by the reference number 600. The luminance spectrum 600 comprises an x-axis 602, which corresponds to frequency, and a y-axis 604, which corresponds to signal amplitude. The luminance spectrum illustrated in FIG. 6 is useful in explaining the operation of the low pass time-sampled analog filter 506 (FIG. 5). As illustrated in FIG. 6, a spectral range 606 corresponds to a frequency range of a standard NTSC composite video signal. A plurality of luminance subcarrier bandpass envelopes 608 each generally correspond to a plurality of luminance subcarriers 610. As shown in FIG. 6, the luminance subcarrier bandpass envelopes 608 are placed, preferably for maximum gain, generally coincident with the luminance subcarrier frequencies. In this manner, luminance information is preserved or passed without undue attenuation by a filter such as the low pass time-sampled analog filter 506 (FIG. 5).

A plurality of chrominance subcarriers 612 are also illustrated in FIG. 6. The low pass time-sampled analog filter 506 (FIG. 5) is adapted such that the chrominance subcarriers 612 correspond generally to nulls between the luminance subcarrier bandpass envelopes 608. Thus, chrominance information is effectively filtered out or blocked by the low pass time-sampled analog filter 506 (FIG. 5).

Figure 7:
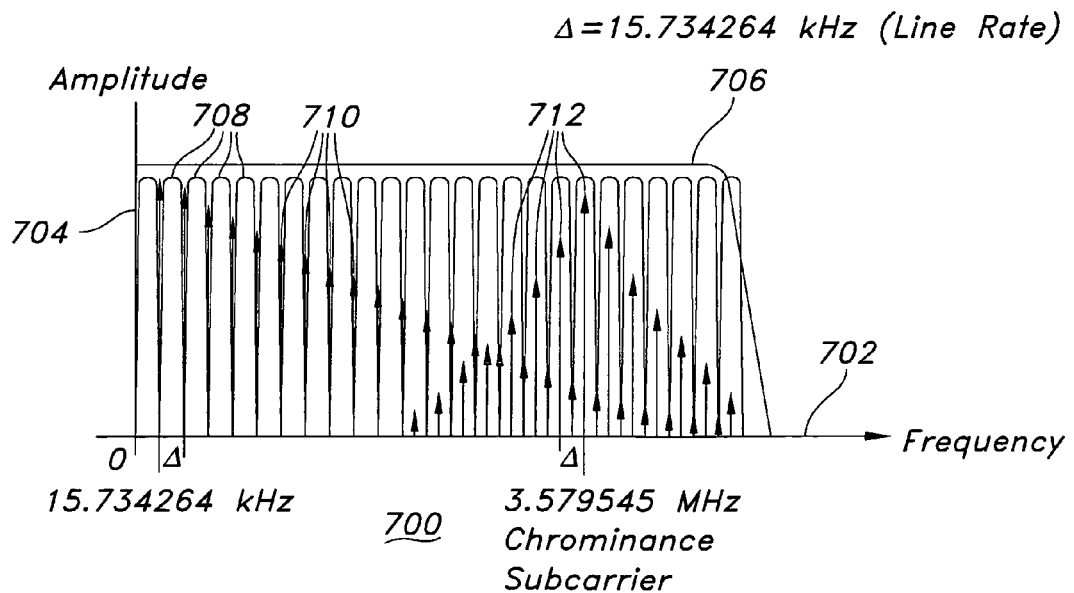
FIG. 7 is a graph showing a filter effect on a chrominance spectrum in accordance with an exemplary embodiment of the present invention.

FIG. 7 is a graph showing a filter effect on a chrominance spectrum in accordance with an exemplary embodiment of the present invention. The graph is generally referred to by the reference number 700. The chrominance spectrum 700 comprises an x-axis 702, which corresponds to frequency, and a y-axis 704, which corresponds to signal amplitude. The chrominance spectrum illustrated in FIG. 7 is useful in explaining the operation of the high pass time-sampled analog filters 508 and 510 (FIG. 5). As illustrated in FIG. 7, a spectral range 706 corresponds to a frequency range of a standard NTSC composite video signal. A plurality of chrominance subcarrier bandpass envelopes 708 each generally correspond to a plurality of chrominance subcarriers 712. As shown in FIG. 7, the chrominance subcarrier bandpass envelopes 708 are placed, preferably for maximum gain, generally coincident with the chrominance subcarrier frequencies. In this manner, chrominance information is preserved or passed without undue attenuation by a filter such as the high pass time-sampled analog filters 508 and 510 (FIG. 5).

A plurality of luminance subcarriers 710 are also illustrated in FIG. 7. The high pass time-sampled analog filters 508 and 510 (FIG. 5) are adapted such that the luminance subcarriers 710 correspond generally to nulls between the chrominance subcarrier bandpass envelopes 708. Thus, luminance information is effectively filtered out or blocked by the high pass time-sampled analog filters 508 and 510 (FIG. 5).

Figure 8:
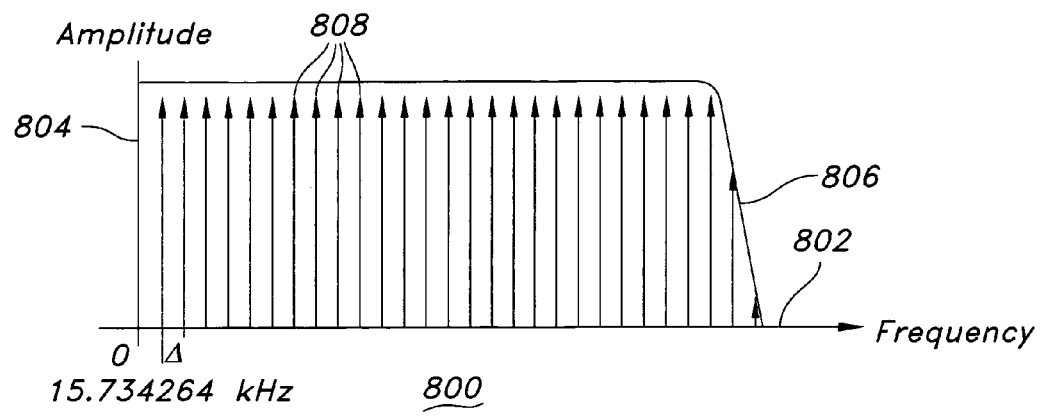
FIG. 8 is a graph showing a post-low pass switch capacitor filter (SCF) output of a luminance spectrum in accordance with an exemplary embodiment of the present invention.

FIG. 8 is a graph showing a post-low-pass switch capacitor filter (SCF) luminance spectrum in accordance with an exemplary embodiment of the present invention. The graph is generally referred to by the reference number 800. The post-low-pass SCF luminance spectrum 800 comprises an x-axis 802, which corresponds to frequency, and a y-axis 804, which corresponds to signal amplitude. A bandpass envelope 806 corresponds to a standard NTSC frequency spectrum. As shown in FIG. 8, a plurality of luminance subcarriers 808 exhibit substantial, preferably maximum, gain within the bandpass envelope 806. The bandpass envelope 806 represents the output of a low pass time-sampled analog filter such as the low pass time-sampled analog filter 506 (FIG. 5).

Figure 9:
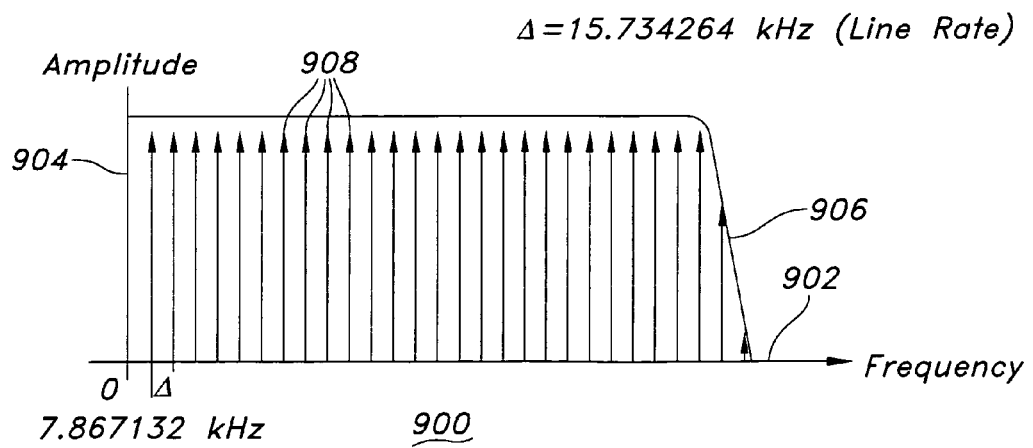
FIG. 9 is a graph showing a post-high pass SCF output of a chrominance spectrum in accordance with an exemplary embodiment of the present invention.

FIG. 9 is a graph showing a post-high-pass SCF chrominance spectrum in accordance with an exemplary embodiment of the present invention. The graph is generally referred to by the reference number 900. The post-high-pass SCF chrominance spectrum 900 comprises an x-axis 902, which corresponds to frequency, and a y-axis 904, which corresponds to signal amplitude. A bandpass envelope 906 corresponds to a standard NTSC frequency spectrum. As shown in FIG. 9, a plurality of chrominance subcarriers 908 exhibit substantial, preferably maximum, gain within the bandpass envelope 906. The bandpass envelope 906 represents the output of a high pass time-sampled analog filter such as the high pass time-sampled analog filters 508, 510 (FIG. 5).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A video system (100) that processes an analog video signal (502), the analog video signal (502) comprising luminance information (408), first chrominance information (410), and second chrominance information (410), the video system (100) comprising:
- a first time-sampled analog filter (506) that extracts the luminance information (408) from a first aliased copy of the analog video signal (502);
- a second time-sampled analog filter (508) comprising a high-pass switch capacitor filter that extracts the first chrominance information (410) from a second aliased copy of the analog video signal (502); and
- a third time-sampled analog filter (510) comprising a high-pass switch capacitor filter that extracts the second chrominance information (410) from a third aliased copy of the analog video signal (502).

2. The video system (100) recited in claim 1, wherein the first time-sampled analog filter (506) comprises a low-pass switch capacitor filter.

3. The video system (100) recited in claim 2, wherein the low-pass switch capacitor filter (506) is adapted to produce the first aliased copy of the analog video signal (502) centered around a sampling frequency.

4. The video system (100) recited in claim 1, wherein each of the high-pass switch capacitor filters (508, 510) is adapted to respectively produce the second aliased copy of the analog video signal (502) and the third aliased copy of the analog video signal (502) centered around a multiple of a sampling frequency divided by two.

5. The video system (100) recited in claim 1, wherein the first time-sampled analog filter (506) comprises a low-pass switch capacitor filter that is adapted to produce the first aliased copy the analog video signal (502) centered around a sampling frequency, and wherein the second time-sampled analog filter (508) and the third time-sampled analog filter (510) are each adapted to respectively produce the second aliased copy of the analog video signal (502) and the third aliased copy of the analog video signal (502) centered around a multiple of the sampling frequency divided by two.

6. The video system (100) recited in claim 1, comprising a circuit (512, 514, 516, 518) that creates a red color signal (520), a green color signal (522) and a blue color signal (524) using the luminance information (408), the first chrominance information (410) and the second chrominance information (410).

7. The video system (100) recited in claim 1, comprising a display (106) that is adapted to produce a visual representation based on the luminance information (408), the first chrominance information (410) and the second chrominance information (410).

8. The video system (100) recited in claim 1, comprising an audio/video signal source (102) that produces the analog video signal (502).

9. The video system (100) recited in claim 8, wherein the audio/video signal source (102) comprises a DVD player.

10. The video system (100) recited in claim 1, wherein the analog video signal (502) comprises a composite video signal.

11. The video system (100) recited in claim 1, wherein the analog video signal (502) comprises an NTSC-compatible video signal.

12. The video system (100) recited in claim 1, wherein the second time-sampled analog filter (508) that extracts the first chrominance information (410) is adapted to extract a portion of the analog video signal (502) that is 90 degrees out of phase compared to a portion of the analog video signal (502) that embodies the second chrominance information (410).

13. The video system (100) recited in claim 1, wherein the first chrominance information (410) comprises red chrominance information (R-Y).

14. The video system (100) recited in claim 1, wherein the second chrominance information (410) comprises blue chrominance information (B-Y).

15. A method of processing an analog video signal (502), the analog video signal (502) comprising luminance information (408), first chrominance information (410), and second chrominance information (410), the method comprising:
- receiving the analog video signal (502);
- extracting the luminance information (408) from a first aliased copy of the analog video signal (502);
- extracting the first chrominance information (410) from a second aliased copy of the analog video signal (502) by performing a high pass time-sampled filter operation on the analog video signal (502); and
- extracting the second chrominance information (410) from a third aliased copy of the analog video signal (502) by performing a high pass time-sampled filter operation on the analog video signal (502).

16. The method recited in claim 15, wherein the act of extracting the luminance information (408) comprises performing a low pass time-sampled filter operation on the analog video signal (502).

17. The method recited in claim 16, wherein the low pass time-sampled filter operation is performed with a low pass switch capacitor filter.

18. The method recited in claim 15, wherein the high pass time-sampled filter operations are each performed with a high pass switch capacitor filter.

19. The method recited in claim 15, wherein:
- the act of extracting the luminance information (408) comprises performing a low pass time-sampled filter operation on the analog video signal (502) with a low pass switch capacitor filter; and
- the acts of extracting the first chrominance information (410) and the second chrominance information (410) are each performed with a high pass switch capacitor filter.

20. The method recited in claim 15, comprising creating a red color signal (520), a green color signal (522) and a blue color signal (524) using the luminance information (408), the first chrominance information (410) and the second chrominance information (410).

21. The method recited in claim 15, comprising producing a visual representation based on the luminance information (408), the first chrominance information (410) and the second chrominance information (410).

22. The method recited in claim 15, wherein the analog video signal (502) is received from a DVD player.

23. The method recited in claim 15, wherein the analog video signal (502) comprises a composite video signal.

24. The method recited in claim 15, wherein the analog video signal (502) comprises an NTSC-compatible video signal.

25. The method recited in claim 15, wherein the first chrominance information (410) is extracted from a portion of the analog video signal (502) that is 90 degrees out of phase compared to a portion of the analog video signal (502) that embodies the second chrominance information (410).

26. A system (100) for processing an analog video signal (502), the analog video signal (502) comprising luminance information (408), first chrominance information (410), and second chrominance information (410), the system (100) comprising:
- means (504) for receiving the analog video signal (502);

means (506) for extracting the luminance information (408) from a first aliased copy of the analog video signal (502);

means (508) for extracting the first chrominance information (410) from a second aliased copy of the analog video signal (502), the means for extracting the first chrominance information (410) comprising a high-pass switch capacitor filter; and means (510) for extracting the second chrominance information (410) from a third aliased copy of the analog video signal (502), the means for extracting the second chrominance information (410) comprising a high-pass switch capacitor filter.

27. The system (100) recited in claim 26, wherein the means (506) for extracting the luminance information (408) comprises a low-pass switch capacitor filter.

28. The system (100) recited in claim 27, wherein the low-pass switch capacitor filter (506) is adapted to produce an image of the analog video signal (502) centered around a sampling frequency.

29. The system (100) recited in claim 26, wherein each of the high-pass switch capacitor filters is adapted to produce an image of the analog video signal (502) centered around a sampling frequency divided by two.

30. The system (100) recited in claim 26, wherein the means(506) for extracting the luminance information (408) comprises a low-pass switch capacitor filter that is adapted to produce an image of the analog video signal (502) centered around a sampling frequency, and wherein the means (508) for extracting the first chrominance information (410) and the means (510) for extracting the second chrominance information (410) are each adapted to produce an image of the analog video signal (502) centered around the sampling frequency divided by two.

31. The system (100) recited in claim 26, comprising means (512, 514, 516, 518) for creating a red color signal (520), a green color signal (522) and a blue color signal (524) using the luminance information (408), the first chrominance information (410) and the second chrominance information (410).

32. The system (100) recited in claim 26, wherein the first chrominance information (410) is extracted from a portion of the analog video signal (502) that is 90 degrees out of phase compared to a portion of the analog video signal (502) that embodies the second chrominance information (410).

33. A video system (100) that processes an analog video signal (502), the analog video signal (502) comprising luminance information (408), first chrominance information (410), and second chrominance information (410), the video system (100) comprising:

a first time-sampled analog filter (506) that is adapted to undersample the analog video signal (502) to obtain the luminance information (408);

a second time-sampled analog filter (508) comprising a high-pass switch capacitor filter that is adapted to undersample the analog video signal (502) to obtain the first chrominance information (410); and a third time-sampled analog filter (510) comprising a high-pass switch capacitor filter that is adapted to undersample the analog video signal (502) to obtain the second chrominance information (410).

34. The video system (100) recited in claim 33, wherein the first time-sampled analog filter (506) is adapted to create a first aliased copy of the analog video signal (502).

35. The video system (100) recited in claim 33, wherein the second time-sampled analog filter (508) and the third time-sampled analog filter (510) are respectively adapted to create a second aliased copy of the analog video signal (502) and a third aliased copy of the analog video signal (502).

36. The video system (100) recited in claim 33, wherein the first time-sampled analog filter (506) comprises a low-pass switch capacitor filter.

37. The video system (100) recited in claim 36, wherein the low-pass switch capacitor filter (506) is adapted to produce a copy of the analog video signal (502) centered around a sampling frequency.

38. The video system (100) recited in claim 33, wherein each of the high-pass switch capacitor filters (508, 510) is adapted to respectively produce a copy of the analog video signal (502) centered around a multiple of a sampling frequency divided by two.

39. The video system (100) recited in claim 33, wherein the first time-sampled analog filter (506) comprises a low-pass switch capacitor filter that is adapted to produce a copy of the analog video signal (502) centered around a sampling frequency, and wherein the second time-sampled analog filter (508) and the third time-sampled analog filter (510) are each adapted to respectively produce a copy of the analog video signal (502) centered around a multiple of the sampling frequency divided by two.

40. The video system (100) recited in claim 33, comprising a circuit (512, 514,516, 518) that creates a red color signal (520), a green color signal (522) and a blue color signal (524) using the luminance information (408), the first chrominance information (410) and the second chrominance information (410).

41. The video system (100) recited in claim 33, comprising a display (106) that is adapted to produce a visual representation based on the luminance information (408), the first chrominance information (410) and the second chrominance information (410).

42. The video system (100) recited in claim 33, comprising an audio/video signal source (102) that produces the analog video signal (502).

43. The video system (100) recited in claim 42, wherein the audio/video signal source (102) comprises a DVD player.

44. The video system (100) recited in claim 33, wherein the analog video signal (502) comprises a composite video signal.

45. The video system (100) recited in claim 33, wherein the analog video signal (502) comprises an NTSC-compatible video signal.

46. The video system (100) recited in claim 33, wherein the second time-sampled analog filter (508) that obtains the first chrominance information (410) is adapted to obtain a portion of the analog video signal (502) that is 90 degrees out of phase compared to a portion of the analog video signal (502) that embodies the second chrominance information (410).

47. The video systemkl0o) recited in claim 33, wherein the first chrominance information (410) comprises red chrominance information (R-Y).

48. The video system (100) recited in claim 33, wherein the second chrominance information (410) comprises blue chrominance information (B-Y).

* * * * *

UNITED STATES PATENT AND TRADEMARK OFFICE
CERTIFICATE OF CORRECTION

PATENT NO. : 7,679,685 B2
APPLICATION NO. : 11/361170
DATED : March 16, 2010
INVENTOR(S) : Hans Alfred Troemel et al.

It is certified that error appears in the above-identified patent and that said Letters Patent is hereby corrected as shown below:

Column 4, line 25, delete "$F_2/2$", insert --$F_s/2$--.

Claim 47, line 56, delete "systemkl0o", insert --system (100)--.

Signed and Sealed this

Twenty-sixth Day of October, 2010

David J. Kappos
*Director of the United States Patent and Trademark Office*